(12) United States Patent
Sutton (10) Patent No.: US 8,286,239 B1
(45) Date of Patent: Oct. 9, 2012

(54) IDENTIFYING AND MANAGING WEB RISKS

(75) Inventor: Michael Sutton, Reston, VA (US)

(73) Assignee: Zscaler, Inc., San Jose, CA (US)

( * ) Notice: Subject to any disclaimer, the term of this patent is extended or adjusted under 35 U.S.C. 154(b) by 701 days.

(21) Appl. No.: 12/178,772

(22) Filed: Jul. 24, 2008

(51) Int. Cl.
*H04L 29/06* (2006.01)
(52) U.S. Cl. .......................................................... 726/22
(58) Field of Classification Search .................... 726/22
See application file for complete search history.

(56) References Cited

U.S. PATENT DOCUMENTS

| | | | |
|---|---|---|---|
| 2003/0196123 A1* | 10/2003 | Rowland et al. | 713/201 |
| 2005/0021997 A1* | 1/2005 | Beynon et al. | 713/200 |
| 2005/0262556 A1* | 11/2005 | Waisman et al. | 726/22 |
| 2006/0075500 A1* | 4/2006 | Bertman et al. | 726/24 |
| 2006/0095459 A1* | 5/2006 | Adelman et al. | 707/102 |
| 2006/0206571 A1* | 9/2006 | Kuwahara | 709/206 |
| 2006/0218403 A1* | 9/2006 | Sauve et al. | 713/175 |
| 2006/0253584 A1* | 11/2006 | Dixon et al. | 709/225 |
| 2007/0130350 A1* | 6/2007 | Alperovitch et al. | 709/229 |
| 2008/0082662 A1* | 4/2008 | Dandliker et al. | 709/225 |
| 2008/0172382 A1* | 7/2008 | Prettejohn | 707/6 |

* cited by examiner

*Primary Examiner* — Michael S McNally
(74) *Attorney, Agent, or Firm* — Clements Bernard PLLC; Lawrence A. Baratta, Jr.; Christopher L. Bernard (57) ABSTRACT

Systems, methods and apparatus for identifying web risks use a web risk service external to network edges of at least one system. The web risk service receives a web request from a computer within the at least one system, the web request identifying at least one network address. The web risk service determines a web risk index score for the at least one network address, and compares the determined web risk index score to at least one threshold value. Based on the comparison, the service determines how to handle the web request, e.g., by forwarding, blocking, and/or logging the web request.

19 Claims, 5 Drawing Sheets

| Risk Identifier | Value | Scaling Factor | Total WRI Score Contribution |
|---|---|---|---|
| Domain Name in Black List | +4 | 1.5 | +6 |
| Recent Domain Name Registration (e.g., within the past 3 days) | +3 | 1 | +3 |
| Zero Pixel iFRAME | +5 | 1 | +5 |
| Valid SSL Certificate | -5 | 1 | -5 |
| | | | WRI Score: 9 |

IDENTIFYING AND MANAGING WEB RISKS

BACKGROUND

This disclosure relates to identifying risks associated with a web request and handling the web request according to the identified risks.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., malware detection software on each computer device within the enterprise, content filtering software, content monitoring software, etc.

Layered security systems are prone to processing inefficiencies and can require many resources within the enterprise to maintain the systems. For example, a company may have a multi-layered security system deployed within its network. A file received on company computers may be processed by a content filtering system, an intrusion detection system and pass through the company's firewall to each computer that receives the file. Furthermore, each computer may include malware scanning software that may scan the file when it is received.

Protecting against threats on the Internet is particularly difficult. Malware detection software must be updated periodically on user's computing devices and gateway security systems. As new malware is found, new signatures and/or logic must be added. Distribution of changes in such software programs is expensive and time consuming. Another issue is that for small/mobile computing devices such as phones, PDAs, and Laptops, malware detection programs consume considerable space and require considerable processing time. Yet another problem is the number of devices on which malware detection programs must typically be updated. Typically, organizations have several thousand computing systems, several operating systems, and hardware platforms and malware products from different vendors.

SUMMARY

The subject matter described in this specification is directed to identifying web risks, such as malware, resulting from web requests, and handling the web requests accordingly.

In general, one aspect of the subject matter described in this specification can be embodied in systems that include a web risk service external to network edges of at least one protected system. The web risk service is configured to receive a web request from a computer within the protected system. The web risk service will calculate a web risk index score for the destination network address of a given web request; compare the determined web risk index (WRI) score to at least one threshold value; and handle the web request based on the comparison. Other implementations of this aspect include corresponding systems, apparatus, and computer program products.

According to one feature, the web risk service operates at a processing node. According to another feature, the web risk service is further configured to transmit a status of the web request to the computer. The web risk service can be configured to perform a lookup in at least one web risk table to determine the web risk index score. The at least one web risk table can reside within the web risk service. The at least one web risk table can include the values of one or more web risk indicators for a particular domain name, URL, or server identified by the web request.

According to yet another feature, the web risk service can be further configured to identify a plurality of values, each of the plurality of values associated with a respective risk indicator, where at least some of the identified plurality of values contribute to the web risk index score. Each of the respective risk indicators can be associated with at least one of a third party analysis, a passive analysis, or an active analysis. According to another feature, the web risk service is configured to determine the web risk index score by calculating a weighted average of at least some of the identified plurality of values. The web risk service is configured to handle the web request by permitting, blocking, or permitting but logging the web request and/or permitting but providing a warning message to the end user.

Another aspect of the subject matter described in this specification can be embodied in systems that include a web risk service external to the network edges of a protected system, where the web risk service is configured to: receive a web request from a computer within the protected system, the web request identifying at least one network address; determine at least one value identifying a risk indicator for the at least one network address; compare the at least one value to a definitive rule list; and handle the web request based on the comparison. Other implementations of this aspect include corresponding systems, apparatus, and computer program products.

The subject matter described in this specification also includes other aspects. One or more of the following advantages can be realized by implementations of the subject matter described in this specification. Identifying web requests with elevated risk potential is enhanced, resulting in reduced likelihood of system or network compromise, improved network performance and the prevention of information leakage.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
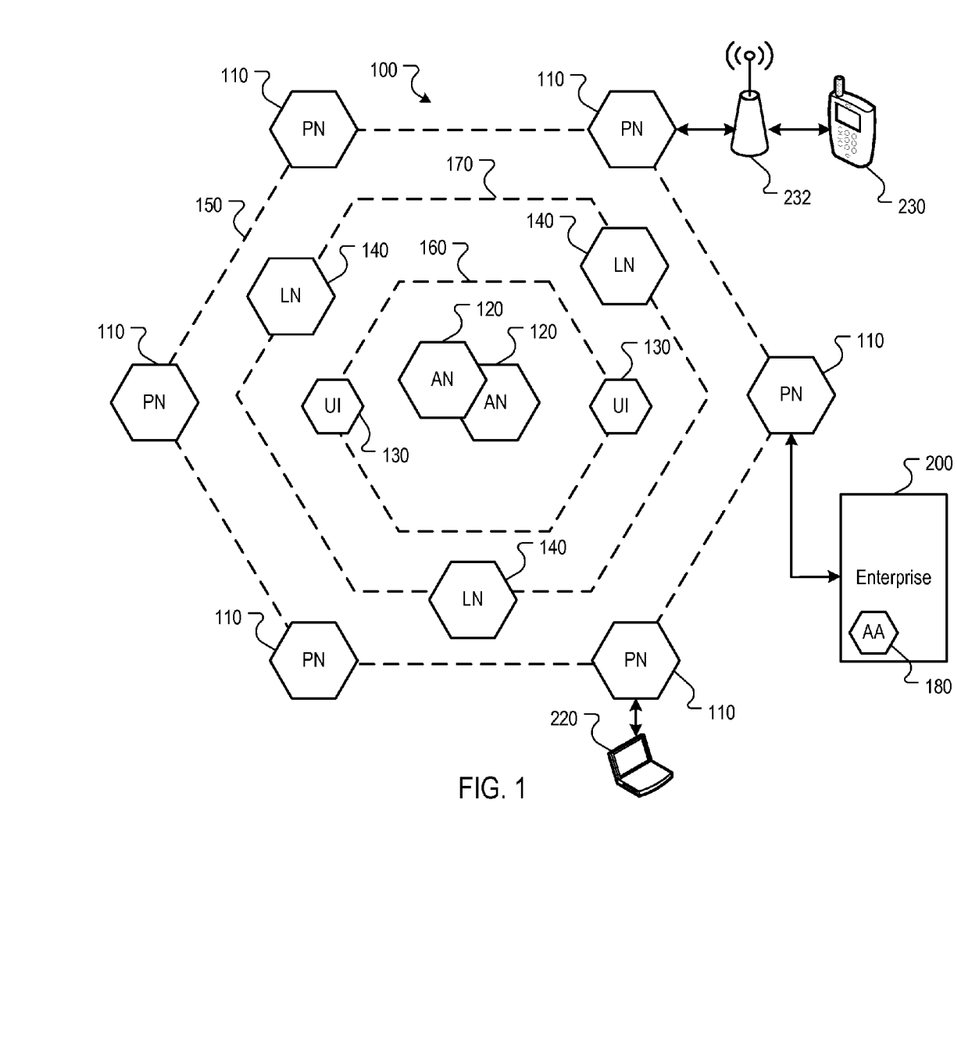
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

§ 1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c1, c2, \ldots, cm]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser, e-mail program, or other network capable application configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 120 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that handles and responds to user requests addressed to remote sites and/or directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, within the enterprise, an access agent 180 can be configured to perform MPLS labeling.

In another transparent proxy mode example, a protected system, such as the enterprise 200, may identify a processing node 110 as a next hop router for communication with the external servers.

§2.0 Example Detailed System Architecture and Operation

Figure 2:
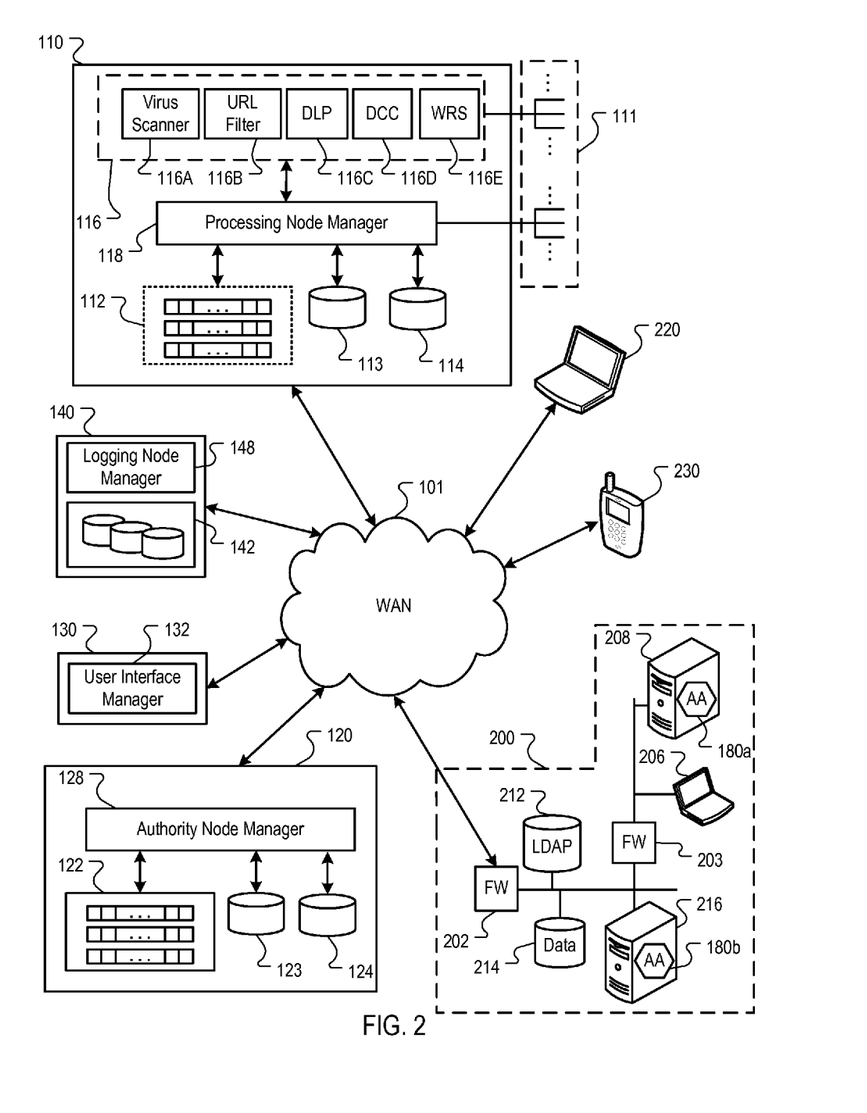
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects the data communication of the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 212 may store, for example, user login credentials for registered users of the enterprise 200 system. Such credentials can include user identifiers, login passwords, and a login history associated with each user identifier. The other data 214 can include sensitive information, such as bank records, medical records, trade secret information, or any other information warranting protection by one or more security measures.

In some implementations, a client access agent 180a can be included on a client computer 208. The client access agent 180a can, for example, facilitate security processing by providing a hash index of files on the user computer 208 to a processing node 110 for malware detection. Other security operations can also be facilitated by the access agent 180a.

In some implementations, a server access agent 180b can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the server access agent 180b.

The computer device 220 and the mobile device 230 can also store information warranting security measures, such as personal bank records, medical information, and login information, e.g., login information to the server of the enterprise 200, or to some other secured data provider server.

§2.1 Example Processing Node Architecture

In some implementations, the processing nodes 110 are external to network edges of the protected systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, a dynamic content categorization (DCC) engine 116D that can classify a content item as passed or failed, and a web risk service (WRS) 116E that evaluates and determines how to handle web requests for which a definitive allow/block decision may not have been provided by other inspection engines. The WRS 116E is described in greater detail with respect to FIGS. 3-6.

According to some implementations, the data inspection engines 116 can include a malware detection engine (not illustrated). The list of the data inspection engines 116A-116E is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

Because the amount of data being processed by the processing nodes 110 can be substantial, the detection processing filter 112 can be used as the first stage of an information lookup procedure. For example, the detection processing filter 112 can be used as a front end to the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In some implementations, the processing node 110 can utilize a layered threat detection architecture 111. The layered threat detection architecture 111 can utilize a multi-layered feedback scheme that abstracts threat data between each layer. An example layered threat detection architecture 111 is shown and described in FIG. 3. Other threat detection architectures can also be used, however, and such architectures need not be layered.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, web risk tables, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 120.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124.

§2.3.1 Threat Data Push

In a threat data push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In some implementations, the authority node manager 128 can automatically transmit the updated threat data to other processing nodes 110. Accordingly, threat data for new threats as the new threats are encountered are automatically distributed to each processing node 110. Upon receiving the new threat data from the authority node 120, each processing node manager 118 can store the updated threat data in the locally stored threat data 114.

§2.3.2 Threat Data Pull and Push

In a threat data pull and push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data, then the processing node manager 118 can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

§2.3.3 Detection Process Filter and Threat Data Push

In a detection process filter and threat data push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the content item is classified by the threat data 114, then the processing node manager 118 can manage the content item in accordance with the security policy data 113 and the classification of the content item.

Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in turn, can update the master threat data 124 and the master detection process filter 122 stored in the authority node data store according to the threat data update received from the processing node 110. In some implementations, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 can update its local copy of the detection processing filter 112 and threat data 114.

§2.3.4 Detection Process Filter and Threat Data Pull and Push

In a detection process filter and threat data pull and push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item, and further update the local detection processing filter 112.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters can be updated in the system 100 of FIGS. 1 and 2. Other update processes, however, can also be used.

The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

§3.0 Identifying Web Risks

The systems described with respect to FIGS. 1 and 2 are operable to calculate a web risk index score associated with all web requests and responses that pass through a processing node. The web risk index score for a given web request is compared against one or more previously established threshold values in order to determine how the request should be handled. For example, the request could be permitted, blocked, permitted but provide a user warning message, or permitted but logged for later analysis.

According to one implementation these processes are performed by a web risk service that can be implemented, for instance, at processing nodes. A processing node responsible for calculating risk scores can also be leveraged to impose restrictions on web requests based on calculated web risk index scores. This permits complete inspection of all data to and from a given resource.

Figure 3:
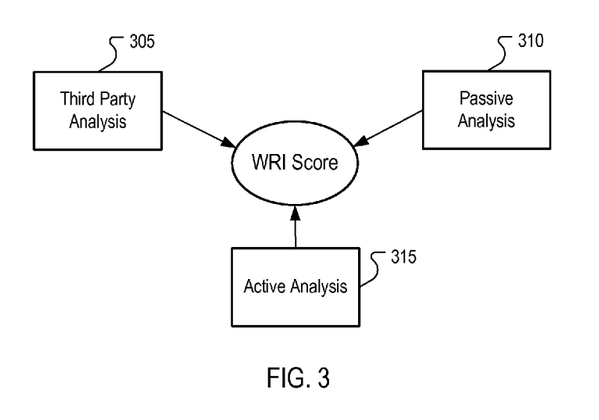
FIG. 3 illustrates analysis components that contribute to the calculation of a WRI score.

As shown in FIG. 3, according to some implementations a web risk index score is based on a comprehensive weighting of a variety of risk indicators identified by three separate analysis categories: third party analysis 305, passive analysis 310, and active analysis 315. WRI scores can be calculated in real-time by the web risk service for all requests and responses. The WRI scores can then be leveraged to implement security policies by blocking or logging those requests which exceed a given and customizable risk threshold. Risk indicators calculated for past WRI score calculations can be leveraged for subsequent requests, thus limiting the processing required to calculate individual WRI scores for each request. For instance, past WRI scores and previously retrieved risk indicators could also be shared among entities, further increasing performance and accuracy.

§3.1 Control Categories

The various risk indicators for a web request can be drawn from up to three separate control categories, where each category is defined based upon the source of the risk information obtained. The first category, third party analysis, identifies web risk information obtained from a source other than the destination of the web request that will be scored by a processing node. This could include, for instance, third party blacklists or other data sources containing information about the destination of a web request. The second category, passive analysis, identifies risk information contained in the original web request query or web response(s). The third category, active analysis, identifies web risk information based on one or more separate queries to the destination of the web request that is to be scored. The additional query/queries are unique and are designed to solicit a different response in order to identify separate risk information.

§3.1.1 Third Party Analysis

A variety of sources can be leveraged for third party analysis including datasets of known malicious sites (i.e. black lists) or datasets containing factual data unrelated to the malicious nature of a site can provide insight into the potential of increased risk at a given site. The existence of sites in such lists can therefore be web risk indicators that can impact the WRI score of a web request or response.

Black lists, which are lists of web based resources that are known to be malicious, can be used for third party analysis. Black lists may take the form of domain names, fully qualified domain names, IP addresses, Uniform Resource Locators (URLs), or any other format, which uniquely identify a web-based resource. Black lists may also be comprised of string based search patterns, such as regular expressions. The existence or absence of the request in a given black list can contribute to the WRI score. Black lists may be available as free or commercial services. A first example of black lists is phishing archives, which are lists of web sites hosting pages set up for the purpose of phishing activities. Examples of such archives include the Google Safe Browsing API, PhishTank API or Netcraft Phishing Site Feed. A second example of black lists are Autonomous System Number Archives (ASN) identifying malicious sources. An ASN is a number used to identify a collection of IP networks and routers under the control of a single entity, and black lists can identify ASNs which are known to be the source of malicious activity.

Another resource that can be used in third party analysis are Whois queries, which can be leveraged to identify registration information for a given domain name. If the whois records for the domain name of a query correspond to the whois records of a previous query for which the WRI score, or a portion of the WRI score attributable to the domain name, was above an acceptable threshold, this can serve to increase the WRI score of a current web request. This is based on the proposition that the whois records suggest that the same individual or group is responsible for managing both domains. Because at least one is known or suspected to be malicious, the second domain is also suspected of being malicious because it is likely to be managed by the same individual or group.

Recent domain name registrations can be another factor used in third party analysis. Because attackers often register new domain names for the purposes of conducting a specific attack and discontinue use of the site in a short time period, a request sent to sites with recently registered domain names can results in a higher WRI score.

Yet another resource that can be used in third party analysis is past results. It is common for attackers to house multiple attacks on the same server. Therefore, if an otherwise innocuous resource is requested from a server for which the WRI score (or a portion of the WRI score attributable to the server) has been above an acceptable threshold, this can result in an increase in the WRI score of subsequent requests. Referencing Autonomous System Numbers or Classless Inter Domain (CIDR) blocks could also extend this approach to blocks of IP addresses owned or managed by the same entity.

On-Line Discussion Forums can also be leveraged for third party analysis. For instance, on-line discussion forums may contain information regarding web sites/pages known to be vulnerable to attack. The content of such forums could regularly be parsed to identify vulnerable sites, and the existence of a web site in such a forum could serve to increase the WRI score for a request to such a site.

Third party analysis can also leverage the use of binary search engines that permit searches to identify the existence of binary files hosted on web sites. An example of such a search engine is the beta Google Binary Search engine, which allows for example, searching for values within the Portable Executable (PE) header of Windows based binary files. Once known malicious code samples are obtained, characteristics of the files could be identified and binary search engines could then be leveraged to identify web sites hosting such files. The existence of known malicious code being hosted on a web site could increase the WRI score for a web request.

The various third party analysis methods and datasets provided above are example variables that can be components of the overall computation of a WRI score, but still other methods and datasets can also be used.

§3.1.2 Passive Analysis

Passive analysis refers to an in-line analysis of the original request/response made by an end user computer in real time. Such requests can be reviewed for web risk indicators that can affect the WRI score for a web request or response.

Examining for obfuscated code in the response body is a first form of passive analysis. In particular, client side code (e.g. HTML, JavaScript, etc.) can be obfuscated using a variety of methods so that it is not human readable when viewing the page source code without first decoding the data. While there are legitimate reasons for obfuscating client side code, it does not provide a high level security and is commonly employed by malicious sites (i.e. phishing sites, botnets, etc.) as a simple means of avoiding detection. Therefore, the existence of obfuscated code, when not deemed to be employed for a legitimate reason, can serve to raise the WRI score.

Identifying web requests seeking to leverage client side vulnerabilities is another method of passive analysis. A variety of web-based attacks are designed to target end users when making requests to malicious web pages. Such attacks may target vulnerabilities in the web browsers used, employ social engineering to convince the end user to perform an action that will lead to a compromise or combine the two approaches. Examples of attacks involving social engineering would include cross-site scripting (XSS) and cross-site request forgery (CSRF) for which the victim must be convinced to send a specific web request. Inspection of the web request/response traffic in real-time could allow for such attacks to be identified, resulting in an increased WRI score.

Another example of passive analysis is identification of zero pixel iFRAMEs. Zero pixel iFRAMES are an example of an HTML element that is a common indication of malicious activity on a web page. This element is often used to hide any visual indication of a link, which is used to redirect the victim to an alternate page. While the existence a zero-pixel iFRAME would not by itself definitively identify a malicious web page, it can serve to increase the WRI score for a web request or response.

Yet another example of passive analysis is the identification of valid or invalid SSL certificates. There is a financial cost associated with obtaining an SSL certificate, especially from a Trusted Root Certificate Authority which attackers are often unwilling to bear. Therefore, the existence of a valid SSL certificate, especially from a Trusted Root Certificate Authority could serve to lower the overall WRI score. Enhanced SSL certificates have both a higher cost and a greater degree of control associated with validating the certificate owner. Therefore, the existence of a valid Enhanced SSL certificate could serve to lower the WRI score to a greater degree than the existence of a standard SSL certificate could lower the WRI score. Conversely, attackers may host malicious content on an SSL enabled site to enhance the appearance of legitimacy as end users tend to mistake secure browser communications with overall site security. The certificates on such sites may be invalid or self-signed. The existence of invalid or self-signed certificates could serve to increase the WRI score.

The various passive analysis methods and datasets provided above are example variables that can be components of the overall computation of a WRI score, but still other methods and datasets can also be used.

§3.1.3 Active Analysis

A third form of analysis that can impact a WRI score is active analysis, which can be performed through additional web requests sent to the server, which houses the destination of the original web request. Active analysis can be performed to identify web risk indicators related to the same web page or other resources housed on that same server. In some implementations active analysis may be limited to requests deemed appropriate, e.g., by the owners of the servers being analyzed.

One active analysis method seeks to identify server side vulnerabilities, which can impact the WRI score. Web sites can be susceptible to a variety of vulnerabilities. While the direct impact of such vulnerabilities may be on the server itself, due to the fact that the vulnerable server may store confidential data related to end users of the system, these end users can indirectly become victims during an attack. Active analysis of sites visited by end users of the system could be used to identify potential vulnerabilities on a site to be visited, which could then influence the overall WRI score for a given request. Such active analysis could occur either in real-time or subsequent to the initial request and the findings could then be leveraged for subsequent requests to the same site. Active analysis would involve queries designed to identify the existence of potentially vulnerable components such as resources with improper access controls, data injection flaws (i.e. SQL injection), information leakage (i.e. authentication credentials included in source code comments), malicious file execution, etc. Resources such as the OWASP Top 10 or Web Application Security Consortium, Threat Classification[1], detail a variety of web server vulnerabilities which can lead to server compromise and increase the risk level for users accessing resources on that server. Such analysis is commonly referred to as black box testing.

Another active analysis method includes fingerprinting web sites to identify possible malicious web sites or code. For instance, additional requests could be made to the server housing the requested resource in order to determine the technologies being deployed on that server. For example, 'banner grabbing' requests could be made to receive responses which reveal the name and version number of software deployed on the server. Additionally, technologies implementing identical protocols may respond to requests with subtle differences. Such requests could be compared to fingerprinting databases to obtain confidence scores identifying the likely technologies deployed on the server. Once potential technologies are identified, they can be compared against databases of known vulnerabilities to determine if the server in question may be vulnerable to attack. If so, the web risk index score could be increased for web requests or responses transmitted to or from the server in question.

§3.2 Calculating the WRI Score

Calculating a weighted average of all appropriate risk indicators as shown below will derive the WRI score:

$$A((X_1+X_2+\ldots+X_n)/n)+B((Y_1+Y_2+\ldots+Y_n)/n)+C((Z_1+Z_2+\ldots+Z_n)/n)$$

where A is the weighting for third party analysis risk indicators, B is the weighting for passive analysis risk indicators, and C is the weighting for active analysis risk indicators. $X_n$ represents the value for the nth risk indicator of third party analysis, $Y_n$ represents the value for the nth risk indicator of passive analysis, and $Z_n$ represents the value for the nth risk indicator of the active analysis.

Although the above equation equally weights each of the values (representing a respective risk indicator) within each analysis, it will be appreciated that one or more of the values can be weighted individually. For instance, the value X1 in the third party analysis may be weighted more or less than the remaining values of third party analysis. Additionally, one or more values may be weighted to zero, such that they are not included in the overall WRI score. Thus, it will be appreciated that the WRI score calculation shown above is illustrative and that other equations may be used.

§3.2.1 Exceptions to WRI Score Calculation and Illustrative WRI Score

In some implementations WRI scores would not need to be calculated during a request for which a definitive rule was in place, which allowed or disallowed the request outright. As an illustrative example, a rule could be implemented that prohibits any traffic to Site X through, for example, URL filtering controls, such that a WRI score calculation is not required. Any request to Site X would be denied and there would be no reason to perform a WRI score calculation. Thus, the WRI score is calculated where a rule is not in place to definitively determine if a given request should be allowed or denied.

Figure 4:
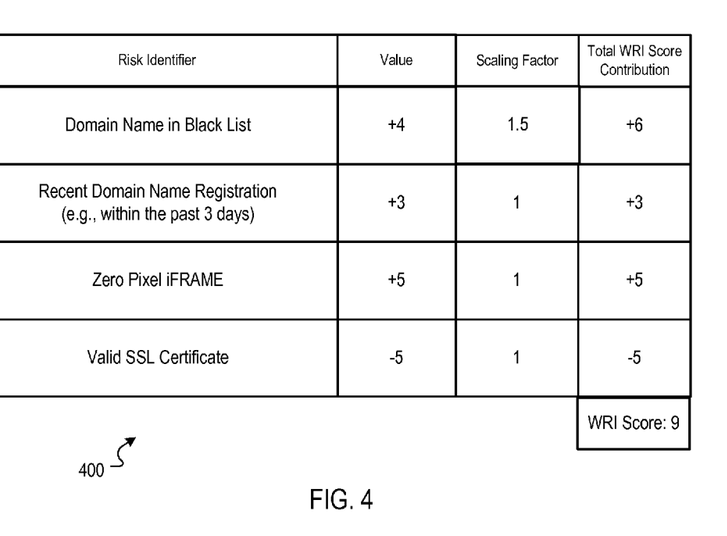
FIG. 4 shows an example table representing a WRI score calculation.

An illustrative example of a WRI score calculation is represented by the table 400 of FIG. 4. The table 400 includes some (but not all) variables described above for the third party analysis, passive analysis, and active analysis. For instance, the WRI score is based on risk identifiers that include the identification of: a domain name in a black list (part of a third party analysis), a recent domain name registration (part of a third party analysis), a zero pixel iFRAME (part of a passive analysis), and a valid SSL Certificate (part of a passive analysis). It will be appreciated that the table 400 is illustrative only, and that one or more other risk indicators described above could have been included in the table 400 as contributing to a WRI score.

As shown in the table 400, values for each risk identifier FIG. 4 are identified. Although these are represented as positive and negative integer values ranging from −5 to +5, almost any values may be attributed to each risk identifier. Thus, a value of +1, 0, or −1 may alternatively be used to indicate whether a particular risk identifier exists and/or is satisfied. Additionally, in the illustrative example of FIG. 4 a scaling factor may be applied to each value to scale, or weight, the risk indicator. This may be done, for instance, to indicate that the factor is more important than other risk indicators in calculating the WRI score. Here, the WRI score is 9 based on the total WRI score contribution from each weighted value of the risk identifiers.

The WRI score can be compared to one or more predefined and customizable risk thresholds that would be used to determine if the request is permitted. As described below, however, the values for each of the risk indicators (or scaled values for each risk indicator) may be compared against a set of definitive rules that mandate how a web request is handled (e.g., forwarded or blocked) regardless of the WRI score and/or existence and/or values for other risk indicators. For instance, referring to the example table 400 of FIG. 4, a definitive rule may indicate that the existence of a domain name in a black list will automatically result in the blocking of the web request.

According to some implementations, WRI scores and/or values for risk indicators (and/or scaled values for risk indicators) may be stored in one or more tables accessible by the web risk service. Upon receipt of a web request the service can perform a lookup in the one or more tables to identify such values, which will prevent the service from having to recalculate or recollect information for a previous request. This process is described in greater detail with respect to FIG. 6, below.

§3.3 Illustrative WRI Calculation Process

Figure 5:
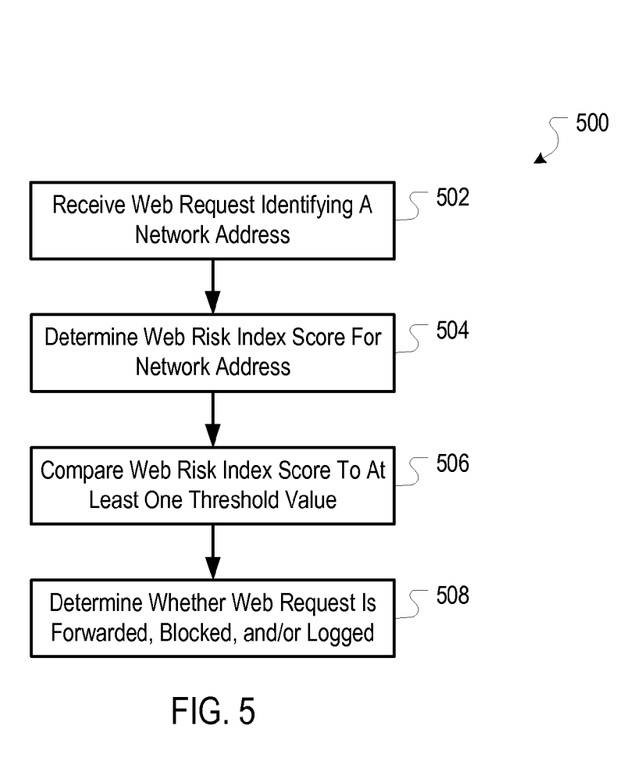
FIG. 5 is a flow diagram of an example process of identifying the risk of a web request and handling the web request accordingly.

FIG. 5 is a flow diagram of an example process 500 for identifying and handling web risks. The process 500 can, for example, be implemented in a web risk service in one or more processing nodes in the system 100 of FIGS. 1 and 2. The stages shown in FIG. 5 are each processes that can be executed independently and concurrently as appropriate.

At stage 502 a web request is received from a computer, where the web request identifies a network address. At stage 504, a WRI score is determined for the network address. For instance, the web risk service can calculate the WRI using appropriate risk indicators, such as provided by third party analysis, passive analysis, and active analysis. At stage 506, the WRI score is compared to at least one threshold value. Next, at stage 508, a determination is made based on the comparison whether the web request is forwarded, blocked, and/or logged by the web service. For instance, if the web request's WRI score fails to exceed a first threshold value it may be forward to its destination. If it exceeds the threshold value it may be forwarded but logged. If the WRI score exceeds a second threshold value it may be blocked. This is an illustrative example only, thus it will be appreciated that only a single threshold value may be used to forward or block web requests.

Figure 6:
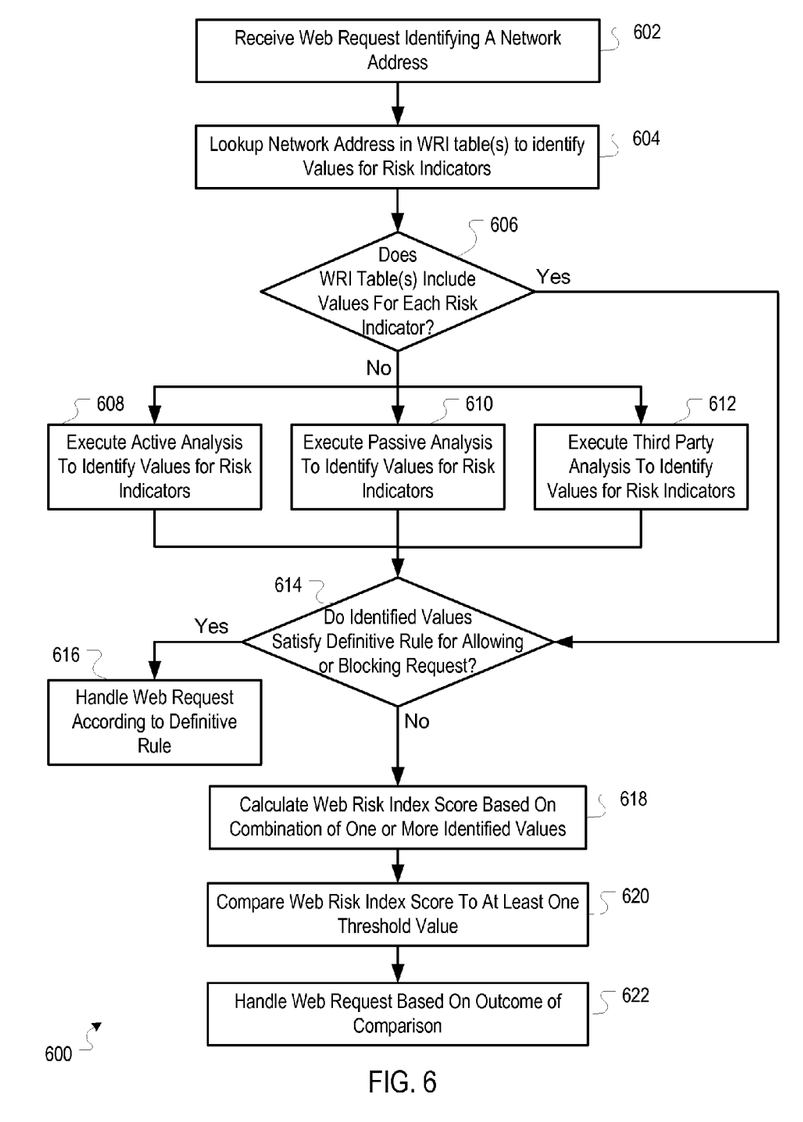
FIG. 6 is a flow diagram of another example process of identifying the risk of a web request and handling the web request accordingly.

FIG. 6 is a flow diagram of an example WRI score calculation and threshold comparison process 600. The process 600 can, for example, be implemented in a web risk service in one or more processing nodes in the system 100 of FIGS. 1 and 2. The stages shown in FIG. 5 are each processes that can be executed independently and concurrently as appropriate.

At stage 602 a web request is received from a computer, where the web request identifies a network address. At stage 604 a lookup is performed in one or more WRI table(s) to identify values for risk identifiers. For instance, past WRI risk identifiers could be stored and shared among entities that are part of the same system 100, resulting in increased performance and accuracy. Thus, if the WRI table(s) include values for each risk identifier (stage 606), the calculation and/or identification of such values is avoided (stages 608, 610, 612). Additionally, although not illustrated in this example, in some implementations, the WRI score for a past web request may be stored and retrieved in a table such that a new WRI score calculation need not occur.

If the WRI table(s) do not include values for each risk identifier (stage 606), third party, passive, and active analysis occurs (stages 608, 610, 612) to identify and/or calculate values for risk indicators. Although each of third party, passive, and active analysis are illustrated, one or more of these stages may be eliminated and thus do not have to contribute to the WRI score.

Next, at stage 614, it is determined whether any of the identified values satisfy a definitive rule for allowing or blocking the request. For instance, if one of the values satisfies or exceeds a threshold value, then the web request could be allowed or blocked based on that determination alone. A definitive block/allow rule could also be encountered prior to the process defined in FIG. 6, for example when implementing alternate data inspection engines 116, in which case the entire process could be bypassed altogether. For instance, referring to the example table 400 of FIG. 4, a definitive rule may indicate that the existence of a domain name in a black list will automatically result in the blocking of the web request, regardless of the final WRI score of that web request, and regardless of whether any other risk indicators exist. The definitive rules can be configurable by a system administrator and retrieved for comparison to the identified values. If a definitive rule is applicable, then the web request is handled according to the rule (e.g., allowed or blocked) at stage 616.

At stage 618, a WRI score is calculated based on a combination of the one or more identified values. In some implementations, a weighted average of all risk indicators is used to calculate the WRI score. According to other implementations, each risk indicator may include a scaling factor to increase or decrease it's impact in calculating the WRI score, as described above with respect to the example of FIG. 4.

At stage 620, the WRI score is compared to at least one threshold value. According to some implementations, the at least one threshold value is previously established and stored by the service. Next, at stage 622, the web request is handled based on the comparison. According to some implementations, the web risk service is configured to transmit a status of the web request (e.g., blocked, allowed, warning, logged, etc.) to the computer that transmitted the request. For example, the request could be permitted, blocked, or permitted but logged for later analysis. As an example, if the web request's WRI score fails to exceed a first threshold value it may be forward to its destination. If it exceeds the threshold value it may be forwarded by logged. If the WRI score exceeds a second threshold value it may be blocked. This is an illustrative example only, thus it will be appreciated that only a single threshold value may be used to forward or block web requests Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising:
 a web risk service operating on a server comprising a processing node and external to network edges of at least one system, the web risk service configured to:
 receive a web request from a computer within the at least one system, the web request identifying at least one network address;
 determine a web risk index score for the at least one network address, the web risk index score based on a third party analysis, a passive analysis comprising an in-line analysis of the web request in real time, and an active analysis comprising a plurality of queries to the at least one network address with each query configured to solicit a different response in order to identify separate risk information;
 compare the determined web risk index score to at least one threshold value;
 handle the web request based on the comparison; and
 provide the determined web risk index score to an authority node such that the authority node shares the determined web risk index score with a plurality of additional processing nodes;
 wherein the web risk service operates at the processing node with all web requests from the computer sent over the Internet via a tunnel, a transparent proxy, a forward proxy, or redirection to the processing node.

2. The system of claim 1, wherein the web risk service is further configured to transmit a status of the web request to the computer.

3. The system of claim 1, wherein the web risk service is further configured to perform a lookup in at least one web risk table to determine the web risk index score.

4. The system of claim 3, wherein the at least one web risk table resides within the web risk service.

5. The system of claim 4, wherein the at least one web risk table comprises the values of one or more web risk indicators for a particular domain name, URL, or server identified by the web request.

6. The system of claim 1, wherein the web risk service is further configured to:
 identify a plurality of values, each of the plurality of values associated with a respective risk indicator based on the third party analysis, the passive analysis and the active analysis, wherein at least some of the identified plurality of values contribute to the web risk index score.

7. The system of claim 6, wherein the web risk service is configured to determine the web risk index score by calculating a weighted average of at least some of the identified plurality of values.

8. The system of claim 1, wherein:
 the third party analysis comprises utilizing datasets of known malicious sites and analyzing datasets comprising factual data to provide insight into potential risk;

the passive analysis comprises an in-line analysis of the web request in real time to obfuscated code, client side vulnerabilities, common indications of malicious activity, and invalid certificates; and the active analysis comprises queries sent by the server to identify vulnerable components and fingerprint web sites.

9. The system of claim 1, wherein the web risk service is configured to handle the web request by permitting, blocking, or permitting but logging the web request.

10. The system of claim 1, wherein the web risk service is configured to handle the web request by permitting the web request and providing a warning message for display on the computer.

11. A network security system, comprising:
a web risk service operating between a plurality of servers and external to network edges of at least one system, the web risk service configured to:
perform a third party analysis, a passive analysis, and an active analysis to determine a plurality of values identifying risk indicators;
receive a web request from a computer within the at least one system, the web request identifying at least one network address;
determine at least one value of the plurality of values identifying a risk indicator for the at least one network address;
compare the at least one value to a definitive rule list;
handle the web request based on the comparison; and
provide the risk indicator for the at least one network address to an authority node such that the authority node shares the risk indicator with a plurality of processing nodes;
wherein the passive analysis comprises an in-line analysis of the web request in real time to obfuscated code, client side vulnerabilities, common indications of malicious activity, and invalid certificates;
wherein the active analysis comprises a plurality of queries sent by the server to identify vulnerable components and fingerprint web sites, wherein each query is configured to solicit a different response in order to identify separate risk information;
wherein the plurality of servers comprise at least one processing node with all web requests from the computer sent over the Internet via a tunnel, a transparent proxy, a forward proxy, or redirection to the at least processing node.

12. A method of malware detection, comprising:
a server comprising a processing node receiving a web request from a computer within the at least one system over the Internet via a tunnel, a transparent proxy, a forward proxy, or redirection, the web request identifying at least one network address, wherein the computer is connected to an external network directly through the processing node;
the server determining a web risk index score for the at least one network address, the web risk score based on a third party analysis, a passive analysis, and an active analysis;
the server comparing the determined web risk index score to at least one threshold value;
the server handling the web request based on the comparison; and
providing the determined web risk index score to an authority node such that the authority node shares the determined web risk index score with a plurality of additional processing nodes;
wherein the passive analysis comprises an in-line analysis of the web request in real time to obfuscated code, client side vulnerabilities, common indications of malicious activity, and invalid certificates; and
wherein the active analysis comprises a plurality of queries sent by the server to identify vulnerable components and fingerprint web sites, wherein each query is configured to solicit a different response in order to identify separate risk information.

13. The method of claim 12, further comprising transmitting a status of the web request to the computer.

14. The method of claim 12, further comprising performing a lookup in at least one web risk table to determine the web risk index score.

15. The method of claim 14, wherein the at least one web risk table comprises the values of one or more web risk indicators for a particular domain name, URL, or server identified by the web request.

16. The method of claim 12, further comprising identifying a plurality of values, each of the plurality of values associated with a respective risk indicator, wherein at least some of the identified plurality of values contribute to the web risk index score.

17. The method of claim 16, wherein determining the web risk index score comprises calculating a weighted average of at least some of the identified plurality of values.

18. The method of claim 12, wherein handling the web request comprises handling the web request by permitting, blocking, or permitting but logging the web request.

19. The method of claim 12, wherein handling the web request comprises handling the web request by permitting the web request and providing a warning message for display on the computer.

* * * * *